United States Patent
Nakayama

(10) Patent No.: US 6,929,835 B2
(45) Date of Patent: Aug. 16, 2005

(54) ANTISOLVENT-LAMINATE BODY

(75) Inventor: Yukinori Nakayama, Mie (JP)

(73) Assignee: Kyocera Corporation, Kyoto (JP)

( * ) Notice: Subject to any disclaimer, the term of this patent is extended or adjusted under 35 U.S.C. 154(b) by 153 days.

(21) Appl. No.: 10/371,696

(22) Filed: Feb. 20, 2003

(65) Prior Publication Data

US 2003/0170413 A1 Sep. 11, 2003

(30) Foreign Application Priority Data

Mar. 1, 2002 (JP) .................................... 2002-055383

(51) Int. Cl.$^7$ .............................. B32B 1/02; G03G 13/20
(52) U.S. Cl. ..................... 428/35.7; 430/110; 430/124
(58) Field of Search .............................. 430/110, 124; 428/35.7

(56) References Cited

U.S. PATENT DOCUMENTS 5,446,082 A * 8/1995 Asai et al. ............... 524/389
5,747,213 A * 5/1998 Okado et al. ............. 430/124

FOREIGN PATENT DOCUMENTS

JP          06-118680         4/1994

* cited by examiner

*Primary Examiner*—Sandra M. Nolan
(74) *Attorney, Agent, or Firm*—Hogan & Hartson LLP

(57) ABSTRACT

The present invention provides an anti-solvent laminate body baying an excellent anti-solvent characteristic when used in a solvent atmosphere or a manufacturing method thereof. In the anti-solvent laminate body used in a solvent atmosphere comprising a substrate portion or a manufacturing method thereof an which an electrostatic latent image developing toner is printed and a printing portion formed of the electrostatic latent image developing toner, wherein the electro latent image developing toner contains a binder resin which has a solubility parameter (SP2) which is different from a solubility parameter (SP1) of a solvent which forms a solvent atmosphere by not lees than about $5(MJ/m^3)^{1/2}$ in an absolute value.

18 Claims, 8 Drawing Sheets

ANTISOLVENT-LAMINATE BODY

BACKGROUND OF THE INVENTION

1. Field of the Invention

The present invention relates to an anti-solvent laminate body (anti-solvent laminate body for printing) and a manufacturing method thereof, and more particularly to an anti-solvent laminate body which is used in a solvent atmosphere and a manufacturing method thereof.

2. Description of the Related Art

In a developing process of an electro-photographic method, a toner which is served for visualizing a electrostatic latent image is generally produced such that a thermoplastic resin (binder resin), waxes, an electric charge controlling agent, magnetic powdery body and other additives are premixed and, thereafter, the mixture is subjected to respective manufacturing steps consisting of a melting/blending step, a pulverizing step and a classifying step sequentially thus producing the toner having a desired particle size. The use of the toner produced in this manner to a special application has been studied along with the popularization of laser printers or the like and the application such as anti-solvent laminate bodies or the like which is used in a solvent atmosphere has been in progress.

For example, in the United States of America, there has been known a special seal printed by a laser printer and is used as a printing seal (label for a number plate) which is adhered to a number plate of a vehicle or a motorcycle. In such an application, at the time of supplying oil to the vehicle or the motorcycle, even when gasoline or light oil is directly or indirectly brought into contact with the printing seal, a toner printed on a resin material for the number plate is requested not to be dissolved by gasoline or light oil.

Further, with respect to a medical container or a cosmetic container, a label for indicating medicine or a label for indicating cosmetic, which is printed by a laser printer has been used. In such an application, when a material containing alcohol is filled into or taken out from the medical container or the cosmetic container, even when the material containing alcohol is brought into contact with the indication label, a toner printed on the indication label is required not to be dissolved by the material containing alcohol.

Further, with respect to a conventional printing laminate body which is formed of electrostatic latent image developing toner, there has been a drawback that the printing is easily peeled off due to gasoline or the material containing alcohol.

On the other hand, in JP06-118680A, there has been disclosed an electro-photographic method which generates a least filming phenomenon even by a long-term copying operation. Metal oxide powder having an average particle size of 0.4 to 2 μm is incorporated into a surface protective layer of a photosensitive body and the difference between the solubility parameter of a binder resin used in a toner and the solubility parameter of a binder resin used in the surface protective layer of the photosensitive body is set to a value not less than 1.5 in an absolute value.

However, the laminate body obtained by the electro-photographic method disclosed in JP06-118680A does not take the use thereof in a solvent atmosphere into consideration at all and hence, there has been still observed a drawback that the printing is easily peeled off from a printing substrate due to gasoline or an alcohol containing material.

Accordingly, inventors of the present invention have extensively studied these conventional drawbacks and have found that with respect to a laminate body used in a solvent atmosphere, the anti-solvent property can be remarkably improved by taking into consideration the difference (ΔSP value) between the solubility parameter (SP1) of a solvent in the use atmosphere and the solubility parameter (SP2) of a binder resin used in electrostatic latent image developing toner. The present invention has been completed based on such a finding.

That is, it is an object of the present invention to provide an anti-solvent laminate body and a manufacturing method thereof which can maintain a printing label as it is, particularly also with respect to a resin substrate, even when the laminate body is used in a solvent atmosphere.

SUMMARY OF THE INVENTION

According to the present invention, there is provided an anti-solvent laminate body which is used in a solvent atmosphere, wherein the anti-solvent laminate body includes a substrate portion on which an electrostatic latent image developing toner is printed and sprinting portion formed of the electrostatic latent image developing toner and, at the same time, the electro latent image developing toner contains a binder resin which has the solubility parameter (SP2) which is different from the solubility parameter (SP1) of a solvent which forms a solvent atmosphere by not less then about 5 $(MJ/m^3)^{1/2}$. Due to such a constitution, the present invention can overcome the above-mentioned drawbacks.

That is, with the use of the electrostatic latent image developing toner containing the binder resin which takes into consideration the difference between the solubility parameter (SP1) of the solvent in the use atmosphere and the solubility parameter (SP2) of the binder resin used in the electrostatic latent image developing toner, even when the laminate body is used in the solvent atmosphere, the initial printing level can be maintained as it is for a long period. Further, due to such a constitution, following advantageous effects can be obtained.

Here, the solvent atmosphere means a state in which a large quantity of an organic solvent such as gasoline, alcohol or the like is used, the organic solvent and the printed electrostatic latent image developing toner may be directly or indirectly brought into contact with each other and hence, the electrostatic latent image developing toner is degraded in a short period or in a long period. For example, the supply of oil to an automobile at a gas station is a typical example in which the printing level is degraded in a short period, while the storage or the like of a medical container in a medicine storage box is a typical example in which the printing level is degraded due to the use of the medical container for a long period.

Further, in constituting the anti-solvent laminate body according to the present invention, it is preferable that the adhesive layer for fixing the substrate portion is further formed on a back surface side of the substrate portion on which the electrostatic latent image developing toner is printed.

By constituting like this, it is possible to provide the anti-solvent laminated body, which exhibits the excellent workability.

Further, in constituting the anti-solvent laminate body according to the present invention, it is preferable that the substrate portion on which the electrostatic latent image developing toner is printed is constituted of a resin substrate, and on a printing surface side of the resin substrate, a modifier layer for enhancing the adhesive force a resin substrate portion between a resin substrate portion and the electrostatic latent image developing toner is further formed.

By constituting like this, even when the substrate portion is formed of a resin substrate, it is possible to provide the anti-solvent laminate body which can enhance the printing accuracy of the electrostatic latent image developing toner and can exhibit the excellent characteristics directed to the maintenance of the printing level in the solvent atmosphere.

Further, in constituting the anti-solvent laminate body according to the present invention, it is preferable that the anti-resistant index of the electrostatic latent image developer toner defined by a following formula (1) is a value not less than about 50%.

$$\text{Anti-solvent index} = \frac{\text{line width (mm) after rubbing by a swab with solvent}}{\text{line width (mm) before rubbing by a swab with solvent}} \times 100(\%) \quad (1)$$

By constituting like this, it is possible to provide the anti-solvent laminate body, which exhibits the excellent anti-solvent characteristics in a fixed amount.

Further, in constituting the anti-solvent laminate body according to the present invention, it is preferable that the binder resin is a partial crosslinking resin.

By constituting like this, it is possible to remarkably enhance the anti-solvent characteristics in the binder resin with respect to any solvents.

Further in constituting the anti-solvent laminate body according to the present invention, it is preferable that the binder resin is either a polyester resin or a styrene-acrylic copolymer.

By constituting like this, it is possible to enhance the charging characteristics, the fluidity characteristics and the like of the electrostatic latent image developing toner for printing the anti-solvent laminate body.

Further, in constituting the anti-solvent laminate body according to the present invention, it is preferable that the solvent is either gasoline or light oil and the anti-resistant index of the electrostatic latent image developer toner with respect to the gasoline or the light oil assumes a value not less than about 50%.

By constituting like this, it is possible to remarkably enhance the anti-solvent characteristics to gasoline or light oil.

Further, in constituting the anti-solvent laminate body according to the present invention, it is preferable that the solvent is an alcohol compound and the anti-resistant index of the electrostatic latent image developer toner With respect to the alcohol compound is a value not less than about 50%.

By constituting like this, it is possible to provide a label for indicating medicine or a label for indicating cosmetic, which exhibits the excellent anti-alcohol characteristics.

Further, in constituting the anti-solvent laminate body according to the present invention, it is preferable that the solvent is a ketone compound and the anti-resistant index of the electrostatic latent image developer toner with respect to the ketone compound is a value not less than about 50%.

By constituting like this, it is possible to remarkably enhance the anti-solvent characteristics against a ketone compound such as acetone, methyl ethyl ketone (butanone), for example.

Further, in constituting the anti-solvent laminate body according to the present invention, it is preferable that the solvent is gasoline or light oil and a subject for attaching the anti-solvent laminate body is either a label for a vehicle or a label for a number plate.

By constituting like this, it is possible to efficiently provide a label (an ornamental label) for a vehicle or a label for a number plate, which exhibits the excellent anti-gasoline characteristics and the excellent anti-light oil characteristics.

Further, in constituting the anti-solvent laminate body according to the present invention, it is preferable that solvent is an alcohol compound and a subject for attaching the anti-solvent laminate body is either a label for a medical container or a cosmetic container.

By constituting like this, it is possible to remarkably enhance the anti-solvent characteristics against an alcohol compound such as ethyl alcohol (ethanol).

Further, in constituting the anti-solvent laminate body according to the present invention, it is preferable that a cover layer is formed on a surface of the printing portion By constituting like this, it is possible to provide the anti-solvent laminate body, which exhibits the excellent anti-solvent characteristics, the excellent weather-ability and the like even when having a simple structure.

Further, according to anther aspect of the present invention, there is provided a manufacturing method of an anti-solvent laminate body which is used in an solvent atmosphere, wherein the manufacturing method includes a method for preparing an unprinted substrate portion by laminating an adhesive layer to a printing substrate, and a step performing printing on the substrate portion based on a developing process using an electrostatic latent image developing toner containing a binder resin which has the solubility parameter (SP2) which is different from the solubility parameter (SP1) of a solvent by at least about 5 $(MJ/m^3)^{1/2}$ in an absolute value.

By performing such a manufacturing method, it is possible to efficiently provide the anti-solvent laminate body, which can maintain a printing state for a long period even when the laminate body is used in the solvent atmosphere.

Further, by performing the anti-solvent laminate body according to the present invention, it is preferable that an electrostatic latent image developer toner having an anti-resistant index which is defined by a following formula (1) and is falls within a range of about 50 to 100% is used as the electrostatic latent image developer toner.

$$\text{Anti-solvent index} = \frac{\text{line width (mm) after rubbing by a swab with solvent}}{\text{line width (mm) before rubbing by a swab with solvent}} \times 100(\%) \quad (1)$$

By performing like this, it is possible to efficiently provide the anti-solvent laminate body, which exhibits the excellent anti-solvent characteristics in a fixed amount.

Further, by performing the anti-solvent laminate body according to the present invention, it is preferable that the method further includes a step for forming a cover layer which covers the electrostatic latent image toner.

By performing like this, it is possible to efficiently provide the anti-solvent laminate body, which exhibits the remarkably excellent anti-solvent characteristics, weather-ability and the like.

Further, according to anther aspect of the present invention, there is provided a number plate or a vehicle in which an anti-solvent laminate body comprising a substrate portion being characterized in that an electrostatic latent image developing toner is printed and a printing portion formed of the electrostatic latent image developing toner is adhered to the number plate or the vehicle as a label, and the electro latent image developing toner contains a binder resin which has a solubility parameter (SP2) which is different from a solubility parameter (SP1) of a solvent which forms a solvent atmosphere by not less than about 5 $(MJ/m^3)^{1/2}$ in an absolute value.

Further, according to anther aspect of the present invention, there is provided a medical container or a cosmetic container in which an anti-solvent laminate body comprising a substrate portion being characterized in that an electrostatic latent image developing toner is printed and a printing portion formed of the electrostatic latent image developing toner is adhered to the medical container or the cosmetic container as a label, and the electro latent image developing toner contains a binder resin which has a solubility parameter (SP2) which is different from a solubility parameter (SP1) of a solvent which forms a solvent atmosphere by not less than about 5 $(MJ/m^3)^{1/2}$ in an absolute value.

DESCRIPTION OF THE PREFERRED EMBODIMENTS

First Embodiment

Figure 1:
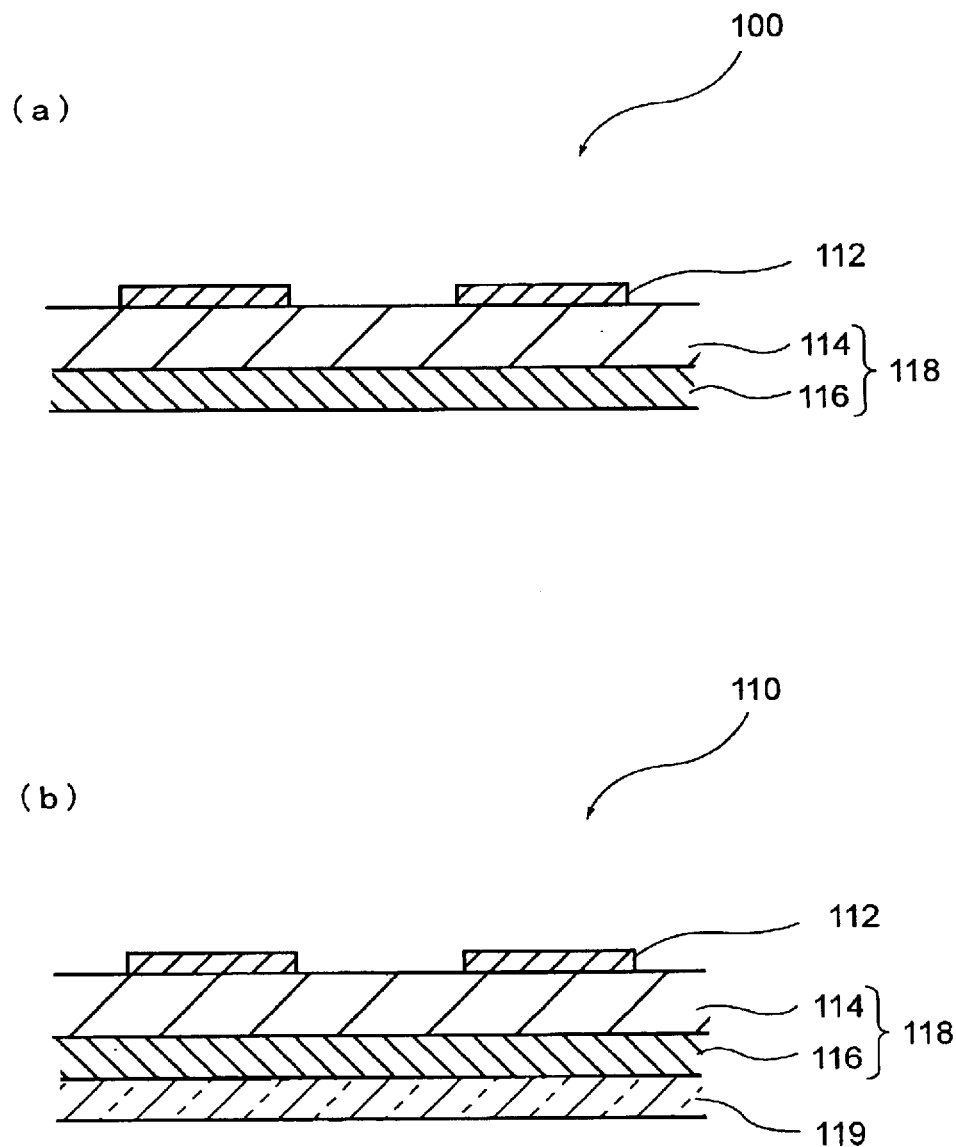
FIGS. 1(a) and (b) are cross-sectional views of anti-solvent laminate bodies of the present invention.

The first embodiment is directed, as shown in FIG. 1(a) and (b), to an anti-solvent laminate body 100, which is used in a solvent atmosphere. The anti-solvent laminate body 100 includes a substrate portion 118 on which electrostatic latent image developing toner is printed and a printing portion 112 formed of the electrostatic latent image developing toner, wherein the electrostatic latent image developing toner includes a binder resin having the solubility parameter (SP2) which is different from the solubility parameter (SP1) of a solvent by not less than about 5 $(MJ/m^3)^{1/2}$ in an absolute value.

Here, with respect to the anti-solvent laminate body 100 shown in FIG. 1(a), an adhesive layer 116 is formed on a back surface of a substrate 114, while with respect to an anti-solvent laminate body 110 shown in FIG. 1(b), a peel-off film 119 is further formed on a back surface of the adhesive layer 116.

1.Substrate Portion (1) Substrate

It is preferable that the substrate portion which constitutes an unprinted laminated body includes a substrate for increasing a mechanical strength and for facilitating handling thereof.

As a type of such a substrate, although it is possible to use paper, a corrugated board or the like, it is preferable to use a resin substrate constituted of one type or a combination of two or more types of films selected from a polyester film, a polyethylene film, a polypropylene film, a polymethylpentene film, a polyvinylchloride film, a polyacrylic film, a polycarbonate film, a polyimide film, a polysulfone film, a polysilicone film, a fluororesin film, a vinylidene fluoride film and the like. That is, it is because that, with the use of such a resin substrate, even when the anti-solvent laminate body 100 is used as an ornamental label for a vehicle or a label for a number plate, the anti-solvent laminate body 100 can obtain the excellent weather-ability and mechanical characteristics and, at the same time, can obtain the relatively excellent surface printing characteristics.

Further, it is preferable to set a thickness of the substrate in the substrate portion to a value which falls within a range of 10 to 2,000 μm. The reason is that when the thickness of the substrate assumes a value less than 10 μm, it is difficult to enhance the mechanical strength and, at the same time, wrinkles or the like are liable to be easily generated so that handling of the substrate portion becomes difficult to the contrary. On the other hand, when the thickness of the substrate exceeds 2,000 μm, it is difficult to adhere the substrate portion using the adhesive layer and, at the same time, there may be a case that it is difficult to perform the treatment such as cutting the substrate portion into a desired shape or size.

Accordingly, it is more preferable to set the thickness of the substrate to a value, which falls within a range of 15 to 500 μm. It is further more preferable to set the thickness of the substrate to a value, which falls within a range of 25 to 100 μm.

Figure 2:
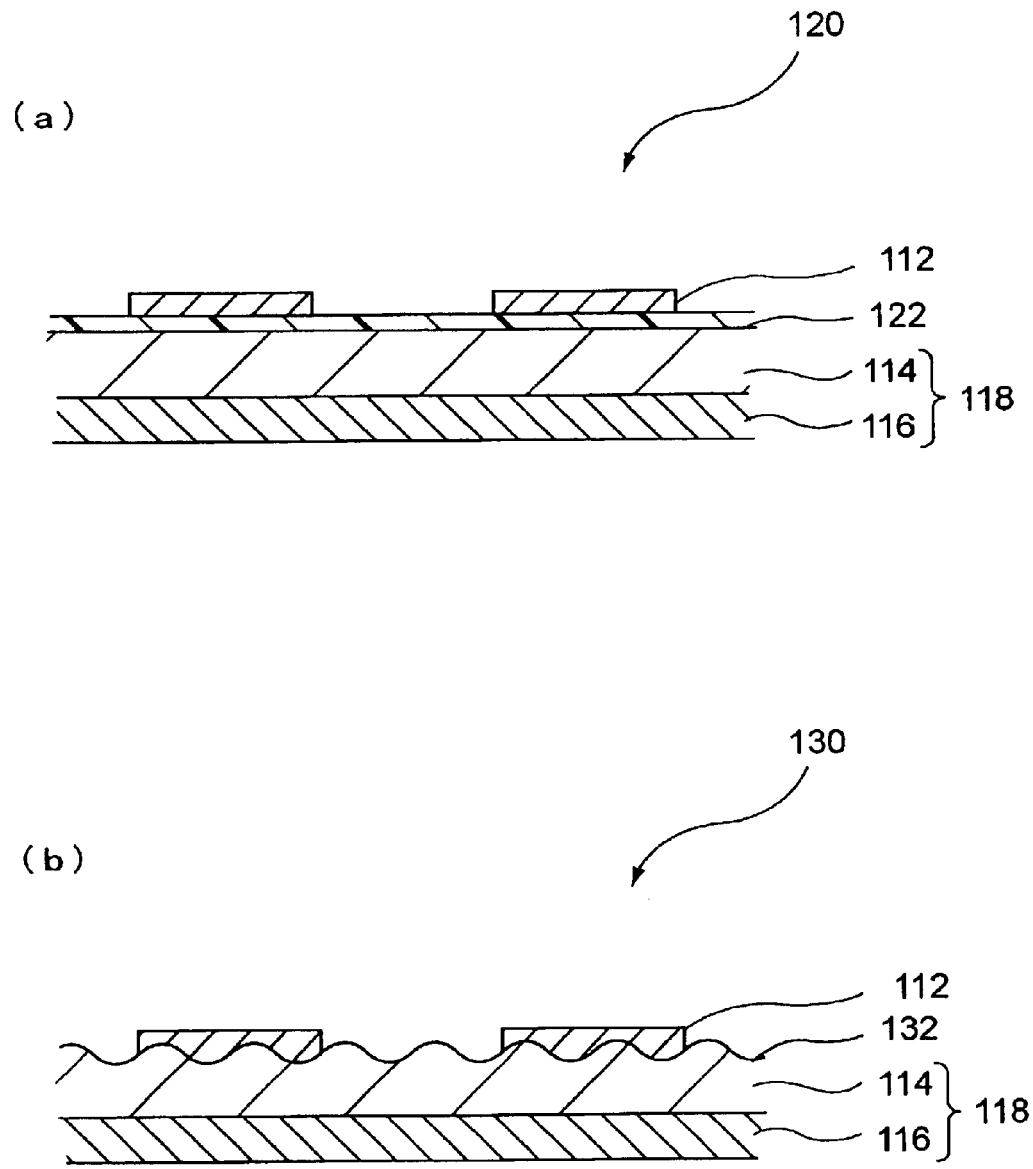
FIGS. 2(a) and (b) are cross-sectional views of other anti-solvent laminate bodies of the present invention.

Further, it is preferable to apply an emboss processing for making a surface of the substrate coarse or a surface treatment using a silane coupling agent, a corona discharge or a flame treatment or the like. For example, as shown in FIG. 2(a), it is preferable to form a surface treatment layer (modifier layer) 122 on a surface of the substrate 114. Particularly, when the substrate portion is constituted of a resin substrate, it is preferable to further form a modifier layer made of a resin such as a acrylic resin, a urethane resin, a silicone resin, an epoxy resin, an epoxy-acrylate resin, a phenol resin or the like which strengthens an tacky adhering force between the substrate portion and an electrostatic latent image developing toner on a printing surface side of the substrate portion. The reason is that, due to such a constitution, even when the substrate portion is formed of the resin substrate, it is possible to provide the anti-solvent laminate body which can enhance the printing accuracy and, at the same time, can exhibit the further excellent printing level preserving characteristics.

Here, it is preferable to set a thickness of the surface treatment layer (modifier layer) 122 to a value which falls within a range of 1 to 50 μm. It is more preferable to set a thickness of the surface treatment layer (modifier layer) 122 to a value which falls within a range of 3 to 25 μm.

Further, as shown in FIG. 2(b), it is also preferable to form a coarse surface 132 on a portion or the whole of the surface of the substrate 114. The reason is that, by applying such a surface treatment, while it is possible to firmly laminate an adhesive layer to a back surface thereof, it is possible to firmly laminate a printing portion made of an electrostatic latent image developing toner to the front surface. Here, to ensure the excellent adhesive force in applying the surface treatment, it is preferable to set a wetting index of the surface of the substrate 114 with respect to water to a value which falls within a range of 35 to 70 dyn/cm to obtain the excellent adhesive strength. Still further, to obtain the sufficient adhesive force by making the surface of the substrate 114 coarse, it is preferable to set the surface roughness (Ra) to a value which falls within a range of 0.1 to 10 μm.

(2) Adhesive Layer

Further, it is preferable that the laminate body includes an adhesive layer. Due to the provision of the adhesive layer, it is possible to easily adhere the laminate body to a body of a vehicle or the like.

As a type of a resin which constitutes the adhesive layer, a polyester resin, a polyethylene resin, a polypropylene resin, a polymethylpentene resin, a polyvinylchloride resin, a polyacrylic resin, a polycarbonate resin, a polyimide resin, a polysulfone resin, a polysilicone resin, a fluororesin and the like can be named.

Further, it is preferable to set an acid value of the resin, which constitutes the adhesive layer to a value, which is not more than 50 mgKOH/g. The reason is that when the acid value exceeds 50 mgKOH/g, there may be a case that the anti-solvent characteristics and the moisture resistance are remarkably lowered. However, when the acid value becomes excessively small, there may be a case that the adhesive force of the adhesive layer to the substrate is lowered, the control of the solubility parameter (SP2) becomes difficult or the adhesive becomes expensive due to an excessive refining.

Accordingly, it is preferable to set the acid value of the resin, which constitutes the adhesive layer to a value which falls within a range of about 0.1 to 30 mgKOH/g. It is more preferable to set the acid value of the resin, which constitutes the adhesive layer to a value which falls within a range of about 0.5 to 10 mgKOH/g.

Further, it is preferable to set a thickness of the adhesive layer to a value, which falls within a range of about 10 to 500 μm. The reason is that when the thickness of the adhesive layer assumes a value less than 10 μm, there may be a case that the adhered laminate body is liable to be easily peeled off. On the other hand, when the thickness of the adhesive layer exceeds 500 μm, there may be a case that the formation of the adhesive layer per se is difficult or the treatment such as cutting the substrate portion into a desired shape or size becomes difficult.

Accordingly, it is more preferable to set the thickness of the adhesive layer to a value, which falls within a range of about 15 to 300 μm. It is further more preferable to set the thickness of the adhesive layer to a value, which falls within a range of about 25 to 100 μm.

2. Printing Portion (1) Toner Particles

With respect to a toner used in the first embodiment, to comply with actual conditions, it is preferable that an inorganic oxide is externally added to toner particles, which are formed of a binder resin, waxes, an electric charge controlling agent and a magnetic powder, for example.

Here, there are no special restrictions regarding the type of binder resin used in the toner of the present invention. However, it is preferable to use a thermoplastic resin, with examples of such being a styrene resin, an acrylic resin, a styrene-acrylic copolymer, a polyethylene resin, a polypropylene resin, a polyvinyl chloride resin, a polyester resin, a polyamide resin, a polyurethane resin, a polyvinyl alcohol resin, a vinyl ether resin, a N-vinyl type resin, and a styrene-butadiene resin.

Further, it is preferable to set the solubility parameter (SP2) of the binder resin to a value which falls within a range of about 10 to 35 $(MJ/m^3)^{1/2}$. The reason is that when the SP2 of the binder resin assumes a value less than 10 $(MJ/m^3)^{1/2}$, there may be a case that types of the binder resin which are soluble to a solvent can be excessively limited. On the other hand, when the SP2 of the binder resin exceeds 35 $(MJ/m^3)^{1/2}$, there may be a case that the resin is liable to be easily crystallized or the electrostatic discharge and the moisture proof are lowered.

Accordingly, it is more preferable to set the solubility parameter (SP2) of the binder resin to a value which falls within a range of about 15 to 30 $(MJ/m^3)^{1/2}$. It is further more preferable to set the solubility parameter (SP2) of the binder resin to a value which falls within a range of about 20 to 25 $(MJ/m^3)^{1/2}$.

With respect to a calculation method of the solubility parameter, although the solubility parameter can be obtained based on the vaporization enthalpy (vaporization latent heat), the refractive index, the surface tension or the like respectively, a Fedors method which calculates types, numbers or main skeletons of functional groups by decomposing the binder resin to a functional group level can be preferably used.

Further, the present invention is characterized in that the difference (ΔSP value) between the solubility parameter (SP2) of the binder and the solubility parameter (SP1) of the solvent in the use environment is set to a value not less than about 5 $(MJ/m^3)^{1/2}$ in an absolute value.

That is, when the solvent of the use atmosphere is gasoline, SP1 of gasoline is 15 $(MJ/m^3)^{1/2}$ and hence, to obtain the anti-gasoline characteristics in the toner, the toner containing a binder resin which exhibits SP2 of less than 10 $(MJ/m^3)^{1/2}$ or not less than 20 $(MJ/m^3)^{1/2}$ is required. The reason is that, to the contrary, when the toner containing the binder resin having SP2 of 10 to less than 20 $(MJ/m^3)^{1/2}$ is used, since the difference between SP2 and SP1 of the solvent is smaller than a given value and hence, both of gasoline and the toner are liable to be compatible to each other. That is, when the ΔSP value assumes a value less than 5, the binder resin used in the toner is contaminated by the solvent (gasoline) and hence, there may arise a case that an image defect such that the printed toner is dissolved and peeled off occurs.

Further, it is preferable for the binder resin to be such that when the weight-average molecular weight (Mw) is measured by gel permeation chromatography (GPC), there are both two molecular weight distribution peaks (a low molecular weight peak and a high molecular weight peak). More concretely, it is preferable to use a binder resin that has a low molecular weight peak in a range of 3,000 to 20,000 and a high molecular weight peak in a range of $3\times10^5$ to $15\times10^5$. Also, it is preferable for the binder resin to be such that the ratio (Mw/Mn) of the weight-average molecular weight (Mw) to the number-average molecular weight (Mn) is 10 or above. The reason for this is that the fixing characteristics of the toner are improved and the offsetting characteristics of the toner are improved.

Note that the weight-average molecular weight (Mw) of the binder resin may be found by detecting the elluent time using the gel permeation chromatography (GPC) and comparing with the calibration curve (standard polystyrene molecular weight vs. elluent time which is made in advance).

Further, it is preferable for the softening point (or melting point) to be a value in a range of 110 to 150° C., more preferably in a range of 120 to 140° C. The reason for this is that when the softening point of the binder resin is below 110° C., there are cases where toner particles fuse together, which results in poor storage stability. On the other hand, when the softening point of the binder resin is above 150° C., there are cases where there is a dramatic deterioration in the fixing characteristics of the toner.

Further, it is preferable for the glass transition point of the binder resin (Tg) to be a value in a range of 55 to 70° C., more preferably in a range of 58 to 68° C. When the glass transition point of the binder resin is below 55° C., there are cases where the resultant toner particles fuse together, which results in poor storage stability for the toner. On the other hand, when the glass transition point of the binder resin is above 70° C., there are cases where the fixing characteristics of the toner are poor.

It should be noted that the softening point and the glass transition point of the binder resin may be found using the falling ball method or from the endothermic peak position or the specific heat capacity change point that can be measured by using a differential scanning calorimeter (DSC).

As favorable fixing characteristics can be achieved, it is preferable for a thermoplastic resin to be used as the binder resin, though when a hardening resin is used, it is preferable for the amount of crosslinking component (amount of gel) as measured by a Soxhlet extractor to be no greater than 10% by weight, and more preferably to be in a range of about 0.1 to 10% by weight.

By introducing this kind of crosslinking structure, improvements can be made to the storage stability, form-retaining ability, and durability of the toner without causing deterioration in the fixing characteristics. Accordingly, it is not necessary to use 100% by weight of the thermoplastic resin as the binder resin, and a cross-linking agent may be added and/or a certain amount of a thermal the hardening resin may be used.

In order to improve the dispersion of the magnetic particles in the binder resin, it is preferable to introduce a function group. As one example, at least one of a hydroxyl group, a carboxyl group, an amino group and a glycidoxy (epoxy) group may be added as the functional group.

It should be noted that it can be confirmed whether the binder resin includes these functional groups using an FT-IR (Fourier Transform Infrared) apparatus, and the included amounts of such functional groups can be measured through titrimetry.

Improved fixing characteristics, offsetting characteristics, and a reduction in read errors for a reader are sought for the toner of the present invention, so that it is preferable for a wax or a wax derivative to be added. There are no particular restrictions regarding the type of wax or wax derivative, though as examples, one or a combination of two or more of the following may be used: a polyethylene wax; a polypropylene wax; a Teflon wax; a Fischer-Tropsch wax; a paraffin wax; ester wax; a montan wax; and a rice wax. Among Fischer-Tropsch waxes, it is preferable to use a wax that has a weight-average molecular weight of 1,000 or above and an endothermic bottom peak (as measured by a DSC) in a range of 100 to 120° C. Examples of such Fischer-Tropsch waxes are the Sasol Wax C1 (high molecular weight grade due to the crystallization of H1, endothermic bottom peak=106.5° C.), the Sasol Wax C105 (formed by the fractional distillation of C1, endothermic bottom peak=102.1° C.), and the Sasol Wax Spray (fine particles of C105, endothermic bottom peak=102.1° C.) that can be obtained from Sasol.

Also, there are no particular restrictions regarding how much wax and wax derivatives is added, but if the entire weight of the toner is set at 100% by weight, for example, it is preferable for the added amount to be in a range of about 1 to 5% by weight. The reason for this is that when the added amount of wax and wax derivatives is below 1% by weight, there is a decrease in the offsetting characteristics of the toner, so that there are cases where it is not possible to effectively stop smearing occurring in the image. On the other hand, when the added amount of wax and wax derivatives is above 5% by weight, there are cases, where toner particles fuse together, which results in poor storage stability for the toner.

Further, it is preferable for a charge controlling agent to be added to the present invention as this results in a remarkable improvement in the charging level and charging initiation characteristics (an index showing whether a predetermined charging level can be reached in a short time) and in other properties such as superior durability and stability. There are no particular restrictions regarding the type of charge controlling agent that can be added, but as examples, the following charge controlling agents that exhibit positive charging characteristics or negative charging characteristics may be used.

If the entire weight of the toner is set at 100% by weight, it is preferable for the added amount of charge controlling agent to fall in a range of 1.5 to 15% by weight. The reason for this is that if the added amount of charge controlling agent is below 1.5% by weight, it is difficult to stabilize the charging characteristics of the toner, so that there can be cases where there is a decrease in image density and/or a decrease in durability. The toner is also susceptible to problems regarding dispersion, which can lead to background printing and/or increased contamination of the photosensitive roll. On the other hand, when the added amount of charge controlling agent is above 15% by weight, there are cases where the toner becomes more environmentally dependent. In particular, at high temperatures and high humidity, there are cases where there is an increased incidence of problems such as a deterioration in charging characteristics, a deterioration in image quality, and contamination of the photosensitive roll.

Accordingly, to achieve a favorable balance between the charge controlling function and factors such as the durability of the toner, it is more preferable for the added amount of charge controlling agent to be in a range of about 2.0 to 10.0% by weight, with a value in a range of about 3.0 to 10.0% by weight being even more favorable.

It is also preferable for magnetic particles to be added to the toner to control the charging characteristics. As examples, magnetic particles that have ferrite powder, iron oxide (magnetite), iron powder, cobalt powder, or nickel powder as their major constituent and magnetic particles such as iron oxide that has been doped with a strongly magnetic metal such as cobalt or nickel can be used. As the magnetic particles, it is also possible to use an alloy that does not contain a fundamentally strongly magnetic element but exhibits strong magnetism after being subjected to an appropriate heat treatment, such as chromium dioxide and the like. Moreover, the magnetic particle made by mixing the above-described magnetic particle and resins in advance, and forming the specified shape is also favorable.

It is preferable for the average particle diameter of the magnetic particles to fall in a range of 0.1 to 1 $\mu$m and more preferably to fall in a range of about 0.1 to 0.5 $\mu$m. The reason for this is that by setting the average particle diameter of the magnetic particles outside this range results in problems such as an uneven dispersion of the magnetic particles in the toner particles and a difficulty in evenly charging the toner particles.

It is also preferable for the magnetic particles to be subjected to a surface treatment using a coupling agent such as a titanate coupling agent or a silane coupling agent. The reason for this is that by subjecting the magnetic particles to a surface treatment results in an improvement in the compatibility of the magnetic particles with the binder resin and in a more even dispersion of the magnetic particles in the binder resin.

It is also preferable to add inorganic fine powders, such as silica, aluminum oxide, titanium oxide and zinc oxide in order to form a toner which exhibits the stable charging characteristics, has the excellent fluidity, and the abrasion excellent property for the optical drum, even if these inorganic fine powders become the corrosion origin of the optical drum.

In addition, these externally-added particles of the inorganic fine powders are also preferable to be subjected to a surface treatment using colloidal silica, hydrophobic silica, and a silane coupling agent or a titan coupling agent.

Further, with respect to the toner, it is preferable to set a segregation ratio of externally-added particles (inorganic oxide) measured by a particle counter to a value which falls within 10.0%.

The reason is that, when the segregation ratio exceeds 10.0%, a quantity of inorganic oxide which is present in a single form is increased and hence, there may be a case that the inorganic oxide is not held on the surface of the toner. Accordingly, when the segregation ratio assumes a value not less than a given value, the inorganic oxide is liable to be easily developed on a photosensitive body. Thus eventually bringing about a case that a quantity of inorganic oxide on a recording medium before fixing is increased.

Further, it is preferable for the average particle diameter of the toner particles to fall in a range of about 5 to 12 µm. The reason for this is that when the average particle diameter of the toner particles is below 5 µm, there are cases where there is a decrease in storage stability. On the other hand, when the average particle diameter of the toner particles is above 12 µm, there are cases where there is a decrease in transportability and where the fixed image is blurred. Consequently, it is more preferable for the average particle diameter of the toner particles to fall in a range of about 6 to 11 µm, and much more preferable for the average particle diameter of the toner particles to fall in a range of about 7 to 10 µm.

(2) Anti-Solvent Index

Further, it is preferable to set the anti-solvent index of the toner defined by a following formula (1) to a value not less than about 50%. The reason is that, when the anti-solvent index of the toner assumes a value less than about 50%, there may be a case that the anti-solvent characteristics is insufficient so that it is difficult to use the anti-solvent laminate body in the solvent atmosphere for a long period. Further, when the anti-solvent index of the toner assumes a value less than about 50%, when the solvent is directly brought into contact with the toner, the solvent dissolves the toner so that the printing level is lowered instantly.

However, when the anti-solvent index of the toner is excessively increased, although the anti-solvent characteristics is improved, a polar group content contained in the binder resin used in the toner is increased and hence, there may be a case that the moisture proof of the toner is lowered.

Accordingly, the anti-solvent index of the toner is set to a value which falls within a range of about 60 to 98%.

However, it is preferable to set the anti-solvent index of the toner to a value, which falls within a range of about 70 to 95%.

$$\text{Anti-solvent index} = \frac{\text{line width (mm) after rubbing by a swab with solvent}}{\text{line width (mm) before rubbing by a swab with solvent}} \times 100 (\%) \quad (1)$$

Here, in the formula (1), the line width (mm) before rubbing with a swab impregnated with the solvent is a line width (mm) immediately after performing printing on a laminate body. On the other hand, the line width after rubbing with a swab impregnated with the solvent is preferably a line width (mm) which is measured after a distal end of the swab is impregnated into the solvent (gasoline or the like) and is made to cross the printed line, a load of 40 g is applied at an angle of 45°, for example, and the swab is rubbed 20 times.

Here, in measuring the anti-solvent index, it is preferable to use the solvent in the use atmosphere as a solvent to be used. However, to clarify the criteria, it is preferable to use any one of gasoline, ethyl alcohol (ethanol) or acetone.

Figure 4:
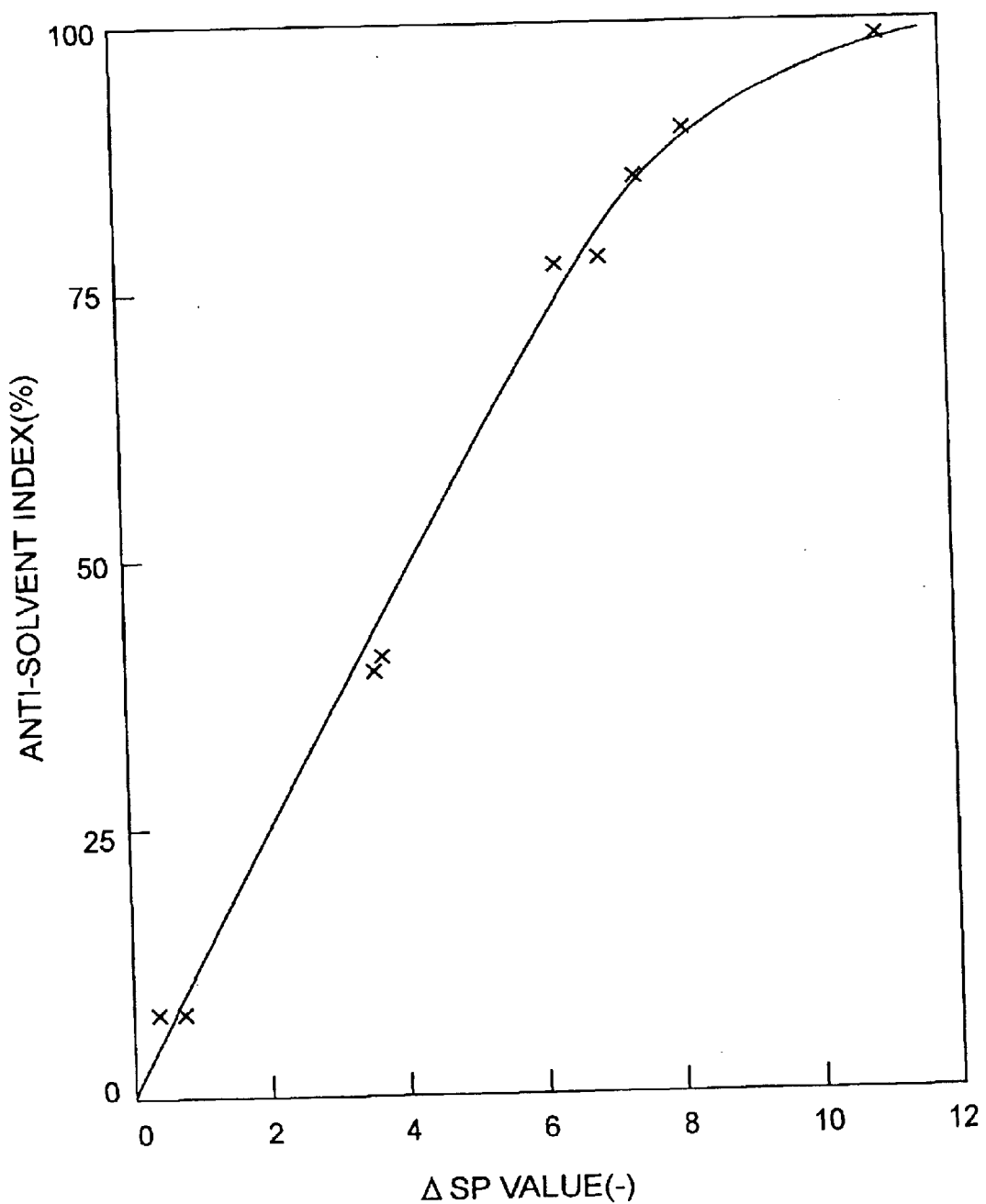
FIG. 4 is a characteristic graph showing the relationship between a ΔSP value and an anti-solvent characteristics index.

Here, the relationship between the anti-solvent index and the previously mentioned $\Delta SP$ value is explained in conjunction with the characteristic graph shown in FIG. 4. In FIG. 4, the $\Delta SP$ value $(MJ/m^3)^{1/2}$ is taken on an axis of abscissas and the anti-solvent index (%) is taken on an axis of ordinates.

As can be understood from the characteristic graph, the larger the $\Delta SP$ value, there exist a tendency that a value of the anti-solvent index is increased. Particularly, when the $\Delta SP$ value exceeds 5 $(MJ/m^3)^{1/2}$, the value of the anti-solvent index assumes a high value which is not less than about 50%. That is, it is understood that by controlling the $\Delta SP$ value, the anti-solvent index which is the direct scale of the anti-solvent characteristics can be also controlled. Accordingly, to the contrary, when it is necessary to obtain the value not less than about 50% as the value of the anti-solvent index, it is preferable to set the $\Delta SP$ value to a value not less than about $5(MJ/m^3)^{1/2}$. It is more preferable to set the $\Delta SP$ value to a value not less than 5.5 $(MJ/m^3)^{1/2}$. It is still more preferable to set the $\Delta SP$ value to a value not less than 6 $(MJ/m^3)^{1/2}$.

Figure 5:
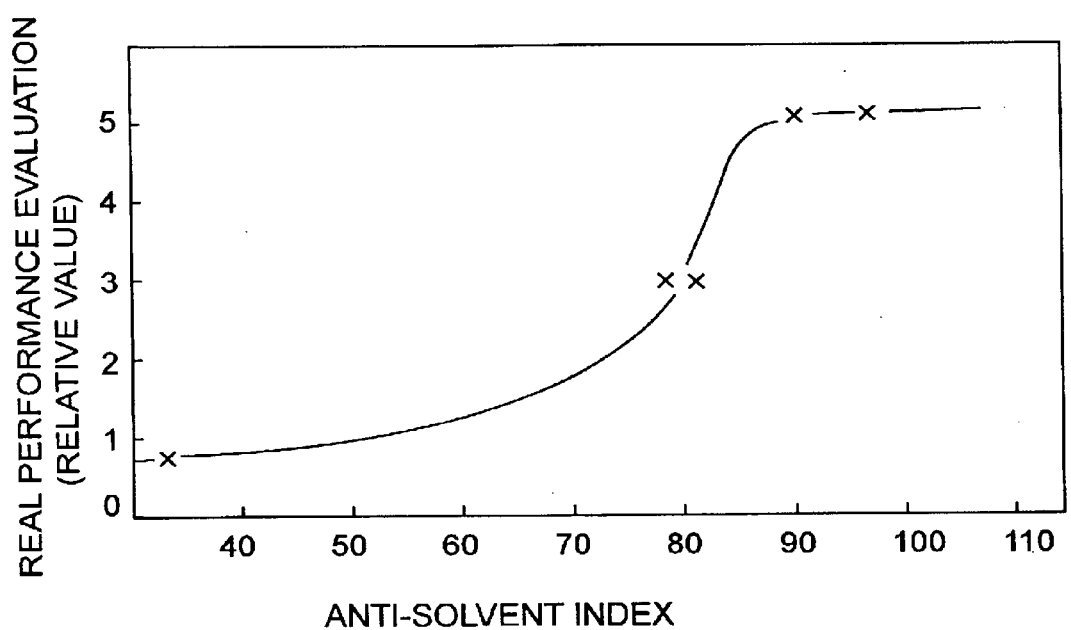
FIG. 5 is a characteristic graph showing the relationship between the anti-solvent characteristics index and the actual performance evaluation.

Further, the relationship between the anti-solvent index and the actual performance evaluation which is evaluated as a label for a number plate is explained in conjunction with a characteristic graph shown in FIG. 5. That is, in FIG. 5, the anti-solvent index (%) is taken on an axis of abscissas and a relative evaluation value of the actual performance evaluation is taken on an axis of ordinates, wherein the actual performance evaluation "very good" obtains the relative evaluation value 5, the actual performance evaluation "good" obtains the relative evaluation value 3, the actual performance evaluation "fair" assumes the relative evaluation value 1, and the actual performance evaluation "bad" obtains the relative evaluation value 0.

As can be understood from the characteristic graph, the larger the value of the anti-solvent index, there is a tendency that the actual performance evaluation is improved. Particularly, when the value of anti-solvent index is not less than 50%, the actual performance evaluation obtains the relative value or 3 or more. That is, it is understood that by indirectly adjusting the anti-solvent index by controlling the above-mentioned $\Delta SP$, it is also possible to control the direct actual performance evaluation.

(3) Cover Layer

Figure 3:
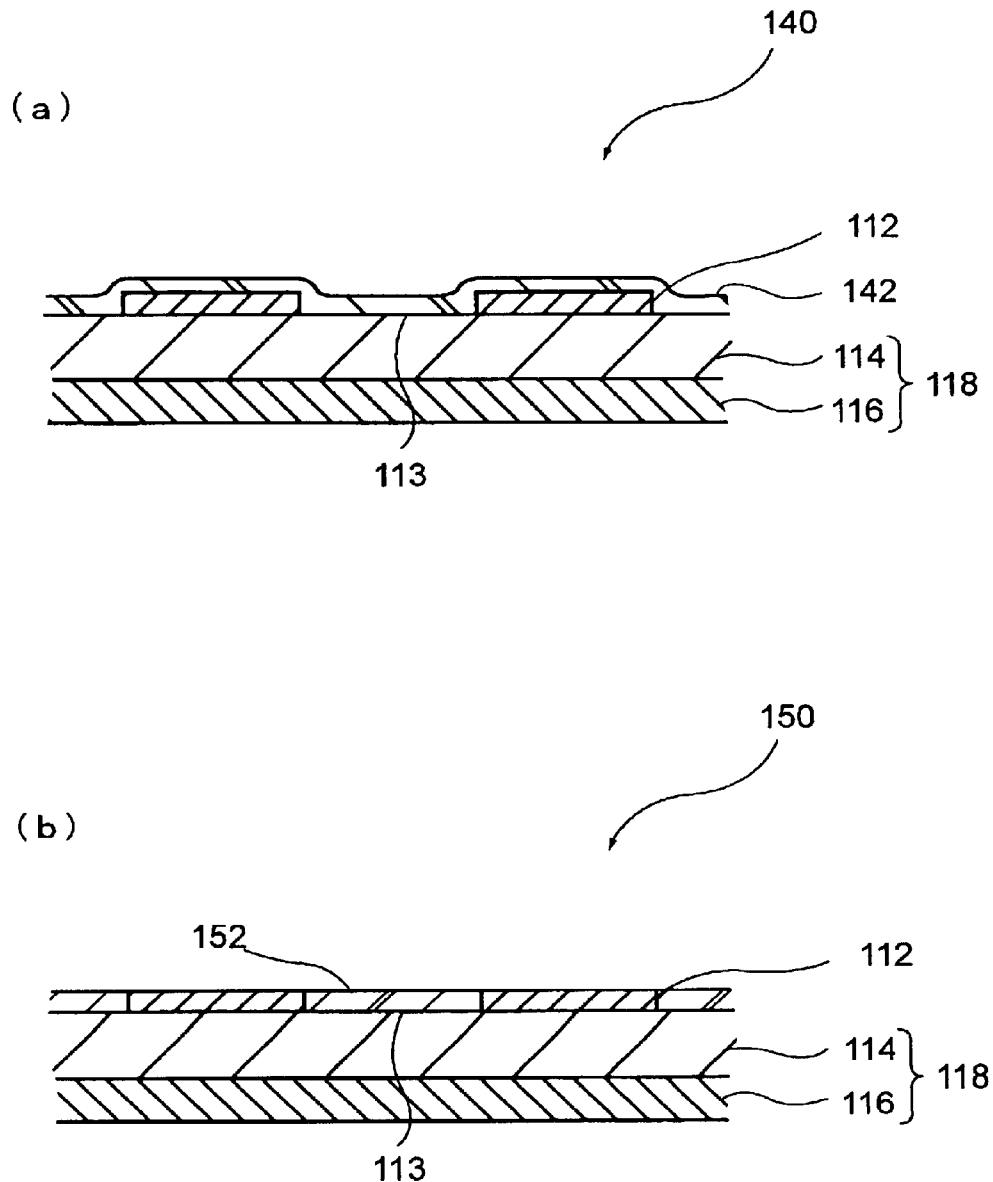
FIGS. 3(a) and (b) are cross-sectional views of still other anti-solvent laminate bodies of the present invention.

It is preferable to further provide a cover layer in the printing portion using the toner. For example, as shown in FIG. 3(a), it is preferable to form a cover layer 142 by covering the whole surface including printing portions 112 and non-printing portions 113. Further, as shown in FIG. 3(b), it is also preferable to form a filling layer (cover layer) 152 by filling a resin in the non-printing portion 113 which are gaps formed between the printing portions 112.

The reason is that, by providing such a cover layer and by constituting the cover layer using a crosslinking material or by adding an ultraviolet lay absorbing agent or the like to the cover layer, it is possible to remarkably enhance the anti-solvent characteristics, the weather-ability and the like of the printing portion.

To be more specific, for example, to remarkably enhance the anti-solvent characteristics, it is preferable to provide the cover layer made of an crosslinking resin such as a crosslinking acrylic resin, a crosslinking polyester resin, a crosslinking silicone resin, a crosslinking epoxy resin, a crosslinking phenol resin, a crosslinking cyanate resin or a crosslinking oxetane.

Further, to remarkably enhance the weather-ability, it is preferable to provide the cover layer which adds an ultraviolet lay absorbing agent, an oxidation prevention agent or the like into such a crosslinking resin by a quantity which falls within a range of, for example, 0.1 to 20 weight % with respect to the total quantity of the cover layer.

Further, depending on the application, there may be a case that even when the resin constituting the cover layer is made of a non-crosslinking resin, the anti-solvent characteristics, the weather-ability or the like of the printing portion can be remarkably enhanced. In such a case, it is unnecessary to crosslink the resin which constitutes the cover layer. For example, when the anti-solvent laminate body is used in the alcohol atmosphere, by merely providing the cover layer made of a polyester resin or a polyacrylic resin, it is possible to remarkably enhance the anti-solvent characteristics, the weather-ability or the like of the printing portion.

Further, when the resin which constitutes the cover layer is made of fluoric resin, the anti-solvent laminate body can exhibit the excellent anti-solvent characteristics, the excellent weather-ability and the excellent anti-fouling characteristics with respect to a surface thereof or the like.

Further, although a thickness of the cover layer is not particularly limited, it is preferable to set the thickness of the cover layer to a value which falls within a range of 0.1 to 500 $\mu$m, for example. The reason is that when the thickness of the cover layer assumes a value less than 0.1 $\mu$m, there may be a case that the cover layer does not perform the covering effect. On the other hand, when the thickness of the cover layer exceeds 500 $\mu$m, there may be a case that the flexibility of the anti-solvent laminate body is lowered.

Accordingly, it is more preferable to set the thickness of the cover layer to a value which falls within range of 1 to 200 $\mu$m. It is further more preferable to set the thickness of the cover layer to a value which falls within a range of 5 to 100 $\mu$m.

Second Embodiment

Further, according to anther aspect of the present invention, the second embodiment is directed to a manufacturing method of an anti-solvent laminate body which is used in an solvent atmosphere, wherein the manufacturing method includes a method for preparing an unprinted substrate portion by laminating an adhesive layer to a printing substrate, and a step performing printing based on a developing process using an electrostatic latent image developing toner containing a binder resin which has the solubility parameter (SP2) which is different from the solubility parameter (SP1) of a solvent which forms the solvent atmosphere by at least about 5 $(MJ/m^3)^{1/2}$ in an absolute value.

1. Step for Preparing Substrate Portion

This step is a step preparing for a substrate portion provided with an adhesive layer and the like. Usually, it is preferable to prepare the substrate portion by forming the adhesive layer on a substrate using a coating method or a printing method.

Since the constitutions of the substrate and the adhesive layer have contents similar to the contents which are explained in the first embodiment, the explanation of these constitutions are omitted in this embodiment.

2. Printing Step Using Developing Process (1) Image Forming Device

Figure 6:
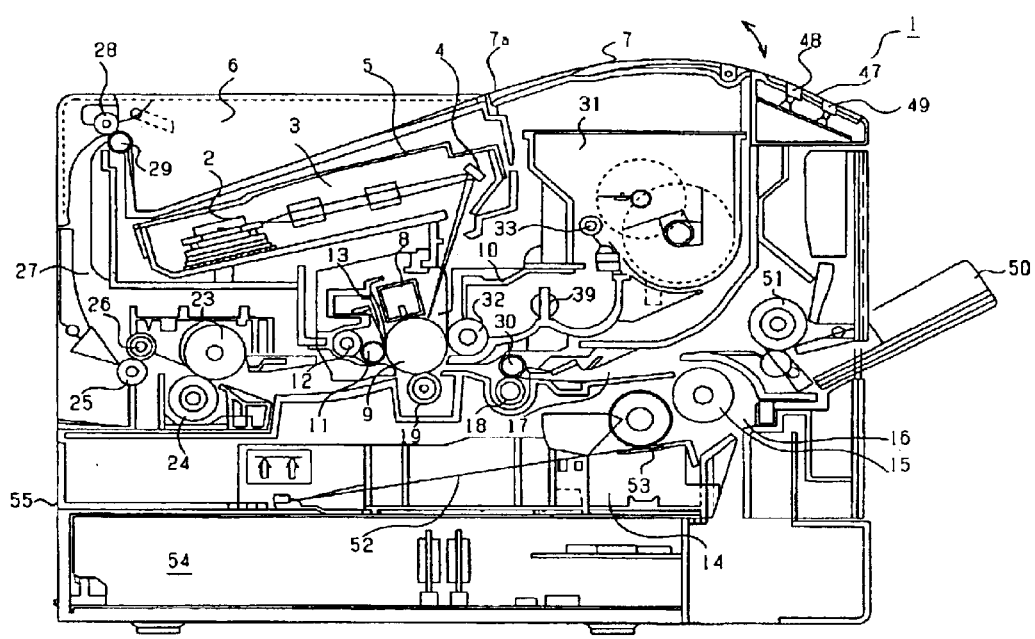
FIG. 6 is a view which is served for explaining the inner structure and the operation of a printer.

In performing a developing process (image forming method), an image forming device 1 shown in FIG. 6 can be preferably used with the toner and image forming method according to the present invention. In more detail, the image forming apparatus 1 includes a charging-type photosensitive drum (the photosensitive roll) 9 that rotates clockwise when viewed as in FIG. 6. A developer 10, a transfer roller 19, a cleaning blade 13, and a charging unit 8 are arranged in the direction of rotation around this photosensitive roll 9. The developer 10 is preferably provided with a developing roller 32, the surface of which is arranged at a predetermined gap from the surface of the photosensitive roll 9, and is constructed so that an appropriate amount of toner can be supplied from a toner container 31.

An optical transfer mechanism 5 for forming dots of an image on a surface of the photosensitive roll 9 is provided at the top of the photosensitive roll 9. This optical transfer mechanism 5 is not illustrated in FIG. 6, but is preferably constructed of a polygon mirror 2 that reflects a laser formed by a laser source and an optical system 3 that directs the laser, via a reflecting mirror 4, between the charging unit 8 and the developing roller 32 to form dots of an image on a surface of the photosensitive roll 9.

A main unit 54 that houses control circuits which are for controlling the apparatus as described later is provided at the bottom of the image forming apparatus 1. A recording sheet container 55 that can be attached to and removed from the image forming apparatus 1 from the outside is provided above the main unit 54. It is preferable for the recording sheet container 55 to be equipped with a storage box 14 for storing the recording sheets before image transfer.

It is preferable for the image forming apparatus 1 to be constructed so that recording sheets that have been placed on a pressure spring 52 are transported by transport rollers 53 and 15 via channels 16 and 17 to a resist roller 18 that is provided opposite a support roller 30.

It is also preferable for the image forming apparatus 1 to be constructed with a front cover 50, which can be opened and closed, provided on the right side of the image forming apparatus 1, so that when this front cover 50 is opened, a recording sheet that is placed upon the front cover 50 is transported into the channel 17 by a transport roller 51.

A fixing unit composed of fixing rollers 23 and 24 is provided on a left side of the image forming apparatus 1, so that the fixing rollers 23 and 24 can fix an image on a recording sheet that has passed between the photosensitive roll 9 and the transfer roller 19. It is also preferable for the image forming apparatus 1 to be constructed so that after fixing, a recording sheet is passed through a channel 27 by transport rollers 25 and 26, before being placed into an image-formed recording sheet collection box 6 by rollers 28 and 29.

It is also preferable for a display unit 47 for displaying various kinds of information, an install switch 48, and a power switch 49 to be provided at the top of the image forming apparatus 1.

(2) Operation

The above image forming apparatus 1 is preferably constructed so that when the power switch 49 is switched on, a main motor (not shown in the drawings) starts to be driven, a start switch (not shown in the drawings) has the photosensitive roll 9 start to rotate in a clockwise direction, and the optical transfer mechanism 5 becomes able to form an image on the photosensitive roll 9.

The image formed on the photosensitive roll 9 is developed by the developing roller 32 of the developer 10, with the resultant toner image being transferred onto a recording sheet by the transfer roller 19. The toner image is then fixed on the recording sheet by the fixing rollers 23 and 24, and the recording sheet is transported by the rollers 25, 27, 28, and 29 to the image-formed recording sheet collection box 6.

It should be noted that the toner that is transferred by the developing roller 32 but not used to develop the image is removed from the photosensitive roll 9 by the cleaning blade 13.

(3) Electrostatic Latent Image Developing Toner

An electrostatic latent image developing toner which is used in the manufacturing method of an anti-solvent laminate body is characterized by containing a binder resin which has a solubility parameter (SP2) which is different from the solubility parameter (SP1) of a solvent which forms the solvent atmosphere by at least about 5 $(MJ/m^3)^{1/2}$ in an absolute value. Since the content of this toner is substantially equal to the toner explained in the first embodiment, the explanation of the toner is omitted here.

3. Step for Forming Cover Layer

After performing the printing step in the developing process, it is preferable to further include a step for forming a cover layer for protecting a printing portion made of the electrostatic latent image developing toner.

Figure 7:
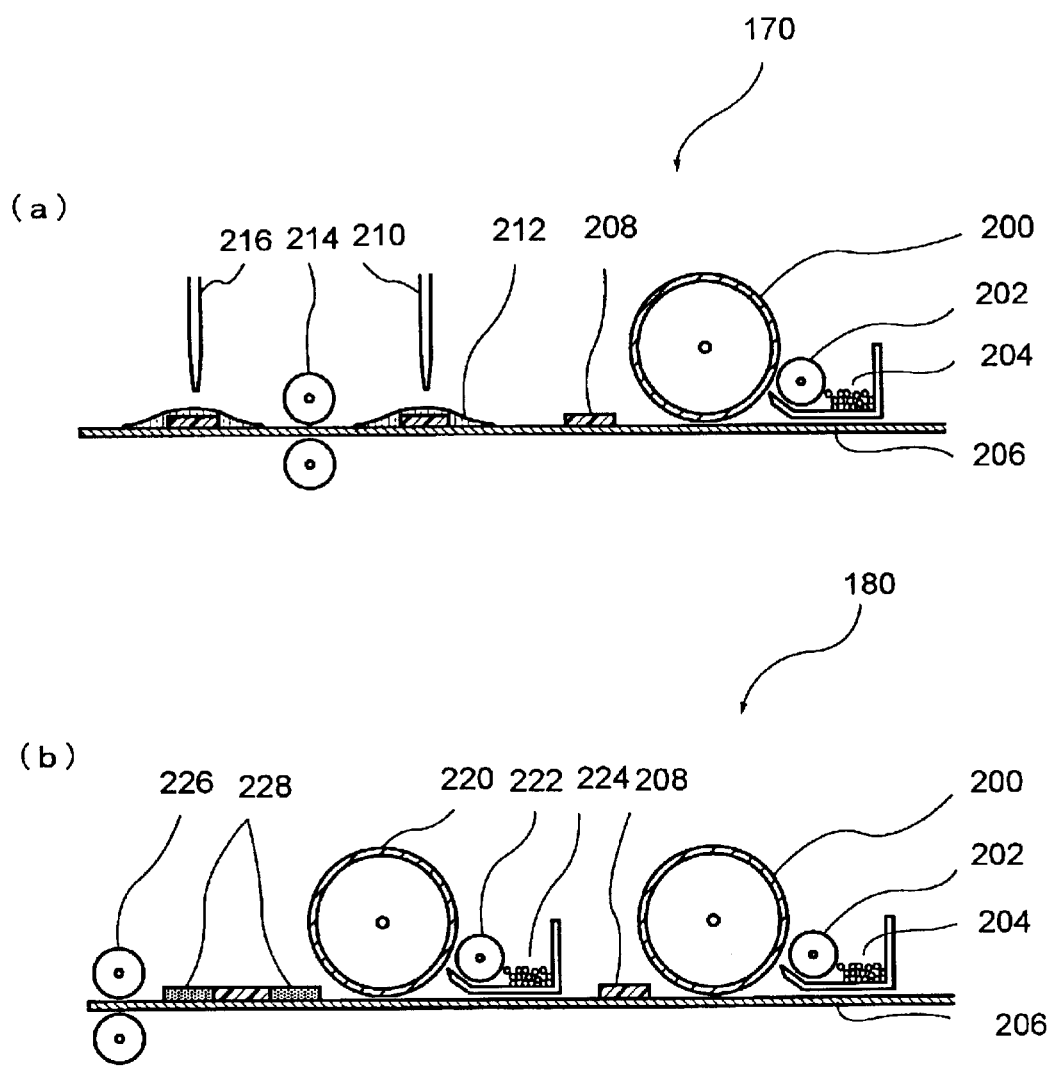
FIGS. 7(a) and (b) are views showing the formation of the cover layer.

For example, as shown in FIG. 7(a), it is preferable that the electrostatic developing toner 204 is printed so as to form the printing portion 208 and, thereafter, the cover layer 212 is formed by applying a resin which constitutes the cover layer by coating, printing or the like. Here, in an cover layer forming device 170 shown in FIG. 7(a), it is also preferable to provide a second cover layer forming device 216 behind a fixing role 214 in place of the cover layer forming portion 210 or together with the cover layer forming portion 210.

Further, as shown in FIG. 7(b), it is also preferable to develop and adhere the toner 244 by a developing process which uses a second photosensitive body 220. Due to such a constitution, it is possible to form a cover layer (protective layer) 228 in a gap defined between the printing portions 208 with accuracy.

4. A Method of Preparing a Sheet of Paper Including a Label for a Number Plate

Further, a method of preparing a sheet of paper 300 including a label for a number plate is explained specifically as the manufacturing method of the anti-solvent laminate body.

Figure 8:
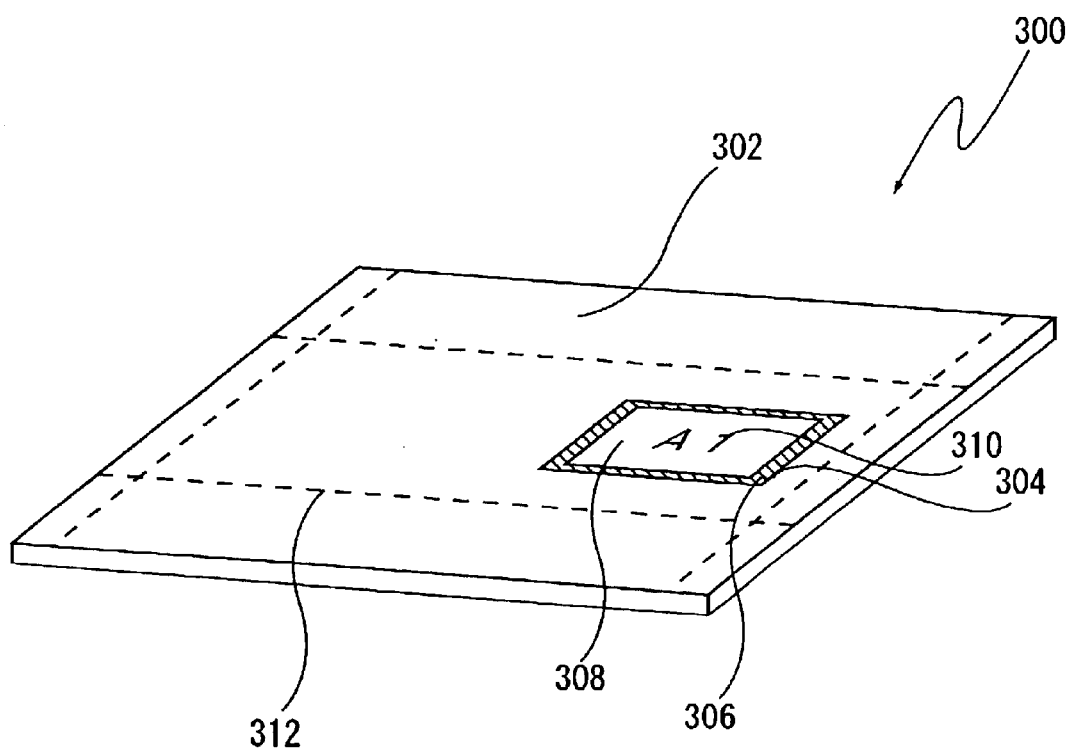
FIG. 8 is a view which is served for explaining a manufacturing method of a paper strip including a label for a number plate.

That is, in preparing the sheet of paper 300 including the label for the number plate, as shown in FIG. 8, it is preferable that a sheet of paper 302 having an opening portion 304 is prepared and a peel-off paper 306 having a size larger than that of an area of the opening portion is preliminarily laminated to the sheet of paper 302 from a rear side of the opening portion 304. Then, it is preferable that a resin substrate 308 having an adhesive layer which constitutes a substrate of the label for the number plate is preliminarily laminated to the peel-off paper 306 preliminarily.

Subsequently, the sheet of paper 302 having such a constitution is subject to the printing performed by a printing device such as a page printer or the like,; wherein by printing desired English letters, numerals or characters from an electrostatic latent image developing toner 310 which exhibits the excellent anti-solvent characteristics to the resin substrate 308, it is possible to easily prepare the sheet of paper 300 including the label for the number plate.

Here, as shown in FIG. 8, it is preferable that the sewing stitches 312 are preliminarily formed in given portions of the sheet of paper 302. Due to such a constitution, after forming the label for the number plate, the label can be easily broken thus facilitating handling of the sheet of paper 300.

EXAMPLE

The present invention is explained in further detail in conjunction with examples. It is needless to say that the following explanation is used for only illustrating the present invention and the scope of the present invention is not limited to the following explanation unless otherwise specified.

Example 1

1. Preparation of Laminate Body (1) Preparation of Toner

A styrene/acrylic resin, a polyethylene wax, an electric charge controlling agent, magnetic powder and melted and mixture by a bi-axial extruding machine such that the mixture obtains a following blending ratio and, thereafter, the mixture is cooled.

(i) styrene/acrylic resin . . . 56 parts by weight
(ii) polyethylene wax . . . 3 parts by weight
(iii) electric charge controlling agent . . . 1 parts by weight
(iv) magnetic powder . . . 40 parts by weight Then, through a pulverizing step and a classifying step, toner particles having an average particle size of 7 μm are obtained. To these toner particles, silica ($SiO_2$) is externally added such that silica amounts to 0.7 weight % with respect to the toner particles.

(2) Preparation of Substrate Portion

To a polyester film having a thickness of 37 μm, an acrylic pressure sensitive adhesive is applied by coating such that the applied adhesive assumes a thickness of about 50 μm after drying. Thereafter, the polyester film applied with the acrylic pressure sensitive adhesive is dried at a temperature of 65 degree centigrade for 10 minutes thus forming a substrate portion provided with an acrylic pressure sensitive adhesive layer.

(3) Printing by Using Toner

The toner is constituted as a magnet-component developer and a line having a width of 2.5 mm is printed using a page printer (FS-1800) which incorporates an amorphous silicon photosensitive body therein made by Kyocera Corporation thus forming a laminate body.

2. Evaluation of Laminate Body
(1) Anti-Solvent Index

With respect to the obtained laminate body, after a distal end of a swab is impregnated into a solvent (gasoline), the swab is made to cross a printing line and the printing line is rubbed with the swab 20 times in a state that a load of 40 g is applied at an angle of 45°. The widths of the printing line before and after rubbing with the swab are respectively measured and the anti-solvent index is calculated based on the above-mentioned formula (1).

(2) Image Density

The toner is constituted as a magnet-component developer and a solid image pattern is printed using a page printer (FS-3750), which incorporates an amorphous silicon photosensitive body therein made by Kyocera Corporation. Thereafter, the image density of the solid image pattern is measured using a Macbeth reflection density meter (made by Macbeth Corporation). To be more specific, the measurement of the image density is performed with respect to nine arbitrary portions of a matted portion of the solid image pattern and an average value is calculated and the calculated value is used as the image density. An obtained result is shown in Table 1.

(3) Background

The evaluation of the image characteristics is performed using a page printer (FS-1800), which incorporates an amorphous silicon photosensitive body therein made by Kyocera Corporation. That is, in a usual environment (20 degree centigrade, 65%RH), an image evaluation pattern is printed at the time of starting printing thus forming an initial image. Background is observed by naked eyes with respect to the initial image and the evaluation of background characteristics is performed based on following criterions. The obtained result is shown in Table 1.

Good: Background is not generated at all.
Fair: Some background is generated.
Bad: Background is apparently generated.

Examples 2 to 5 and Comparative Examples 1 to 4

As shown in Table 1, while changing the type of binder resin, the solubility parameter (SP2) of the binder resin and the type of solvent, printed laminate bodies are prepared in the same manner as the example 1 and the evaluation is made with respect to these laminate bodies. The obtained result is shown in Table 2.

That is, the example 2 is directed to the toner containing the polyester resin which has a SP value slightly lower than that of the example 1 and hence, the $\Delta$SP value and the anti-solvent index are slightly reduced. However, the $\Delta$SP value and the anti-solvent index are respectively still a value not less than 5 $(MI/m^3)^{1/2}$ and a value not less than 50% and hence, these values indicate that the toner has the sufficient anti-solvent characteristics.

Further, the example 3 is directed to the toner containing the polyester resin which has a SP value further slightly lower than that of the example 1 and hence, the $\Delta$SP value and the anti-solvent index are slightly reduced. However, the $\Delta$SP value and the anti-solvent index are respectively still a value not less than 5 $(MJ/m^3)^{1/2}$ and a value not less than 50% and hence, these values indicate that the toner has the sufficient anti-solvent characteristics.

Further, the example 4 is directed to the toner containing the polyester resin which has a SP value further slightly lower than that of the example 1 and the type of solvent in the use atmosphere is changed from gasoline to acetone and hence, the $\Delta$SP value and the anti-solvent index are slightly reduced. However, the $\Delta$SP value and the anti-solvent index are respectively still a value not less than 5 $(MJ/m^3)^{1/2}$ and a value not less than 50% and hence, these values indicate that the toner has the sufficient anti-solvent characteristics.

Further, compared to the example 1, the type of the binder and the type of solvent in the use atmosphere are changed in the example 5 and hence, the $\Delta$SP value and the anti-solvent index are slightly reduced. However, the $\Delta$SP value and the anti-solvent index are respectively still a value not less than 5 $(MJ/m^3)^{1/2}$ and a value not less than 50% and hence, these values indicate that the toner has the sufficient anti-solvent characteristics.

On the other hand, compared to the example 1, although the type of binder is not changed in a comparative example 1, the type of solvent in the use atmosphere is largely changed. Accordingly, the $\Delta$SP value is reduced and the anti-solvent index is also remarkably reduced.

Further, in a comparative example 2, although the toner contains a polyester resin having the SP value slightly lower than that of toner of the example 1, the type of solvent in the use atmosphere is largely changed. Accordingly, the $\Delta$SP value is reduced and the anti-solvent index is also remarkably reduced.

Further, in a comparative example 3, the toner is a toner containing a styrene-acrylic resin having the SP value considerably lower than that of toner of the example 1. Accordingly, the $\Delta$SP value is reduced and the anti-solvent index is also remarkably reduced.

Further, in a comparative example 4, the toner is a toner containing a styrene-acrylic resin having the SP value considerably lower than that of toner of the example 1 and the type of solvent in the use atmosphere is also changed. Accordingly, the $\Delta$SP value is reduced and the anti-solvent index is also remarkably reduced.

TABLE 1

|  | Binder | SP$(MJ/m^3)^{1/2}$ | Solvent | SP$(MJ/m^3)^{1/2}$ | $\Delta$ SP$(MJ/m^3)^{1/2}$ |
|---|---|---|---|---|---|
| Example 1 | Polyester | 26.6 | Gasoline | 15.4 | 11.2 |
| Example 2 | Polyester | 23.5 | Gasoline | 15.4 | 8.1 |
| Example 3 | Polyester | 21.7 | Gasoline | 15.4 | 6.3 |
| Example 4 | Polyester | 26.6 | Acetone | 19.7 | 6.9 |
| Example 5 | Styrene-Acryl | 19.1 | Ethylalcohol | 26.2 | 7.1 |
| Comparative Example 1 | Polyester | 26.6 | Ethylalcohol | 26.2 | 0.4 |
| Comparative Example 2 | Polyester | 23.5 | Acetone | 19.7 | 3.8 |
| Comparative Example 3 | Styrene-Acryl | 19.1 | Gasoline | 15.4 | 3.7 |

TABLE 1-continued

| | Binder | SP(MJ/m³)^(1/2) | Solvent | SP(MJ/m³)^(1/2) | Δ SP(MJ/m³)^(1/2) |
|---|---|---|---|---|---|
| Comparative Example 4 | Styrene-Acryl | 19.1 | Acetone | 19.7 | 0.6 |

TABLE 2

| | Initial Image | | Δ SP | Anti-Solvent |
|---|---|---|---|---|
| | Image density | Background | (MJ/m³)^(1/2) | Index(%) |
| Example 1 | 1.40 | Good | 11.2 | 98 |
| Example 2 | 1.39 | Good | 8.1 | 90 |
| Example 3 | 1.41 | Good | 6.3 | 80 |
| Example 4 | 1.41 | Good | 6.9 | 83 |
| Example 5 | 1.38 | Good | 7.1 | 86 |
| Comparative Example 1 | 1.40 | Good | 0.4 | 10 |
| Comparative Example 2 | 1.41 | Good | 3.8 | 43 |
| Comparative Example 3 | 1.39 | Good | 3.7 | 40 |
| Comparative Example 4 | 1.37 | Good | 0.6 | 10 |

Examples 6 to 10 and Comparative Examples 5 to 8

The anti-solvent laminate bodies obtained in the examples 1 to 4 and the comparative examples 3 are evaluated as labels for number plates. That is, the respective obtained anti-solvent laminate bodies are adhered to number plates of gasoline automobiles (exhaust quantity: 3000 cc, 5 sets) and the supply of oil at a temporarily installed gas station and the traveling test of an automobile on a test road are repeatedly performed and the performance evaluation is performed based on following evaluation criterions.

Very good: Even when the supply of oil and the traveling test are repeated not less than 1000 times, no deterioration of the printing level is observed with respect to not less than 50% of the automobiles.

Good: When the supply of oil and the traveling test are repeated 100 times to less than 1000 times, the deterioration of the printing level is observed with respect to not less than 50% of the automobiles.

Fair: When the supply of oil and the traveling test are repeated 10 times to less than 100 times, the deterioration of the printing level is observed with respect to not less than 50% of the automobiles.

Bad: When the supply of oil and the traveling test are repeated less than 10 times, the deterioration of the printing level is observed with respect to not less than 50% of the automobiles.

TABLE 3

| | Δ SP(-) | Anti-Solvent Index(%) | Real Performance Evaluation |
|---|---|---|---|
| Example 6 | 11.2 | 98 | Very Good |
| Example 7 | 8.1 | 90 | Very Good |
| Example 8 | 6.3 | 80 | Good |
| Example 9 | 6.9 | 83 | Good |
| Comparative Example 5 | 3.7 | 40 | Bad |

What is claimed is:

1. An anti-solvent laminate body used in a solvent atmosphere comprising a substrate portion on which an electrostatic latent image developing toner is printed and a printing portion formed of the electrostatic latent image developing toner, wherein an adhesive layer for fixing the substrate portion is further formed on a back surface sided of the substrate portion, and the electro latent image developing toner contains a binder resin which has a solubility parameter (SP2) which is different from a solubility parameter (SP1) of the solvent which forms the solvent atmosphere by not less than about $5(MJ/m^3)^{1/2}$ in an absolute value.

2. The anti-solvent laminate body according to claim 1, wherein the substrate portion on which the electrostatic latent image developing toner is printed is constituted of a resin substrate, and on a printing surface side of the resin substrate, a modifier layer for enhancing the an adhesive force a resin substrate portion between a resin substrate portion and the electrostatic latent image developing toner is further formed.

3. The anti-solvent laminate body according to claim 1, wherein an anti-resistant index of the electrostatic latent image developer toner defined by a following formula (1) assumes a value not less than about 50%

$$\text{Anti-solvent index} = \frac{\text{line width (mm) after rubbing by a swab with solvent}}{\text{line width (mm) before rubbing by a swab with solvent}} \times 100(\%). \quad (1)$$

4. The anti-solvent laminate body according to claim 1, wherein the binder resin is a partial crosslinking resin.

5. The anti-solvent laminate body according to claim 1, wherein the binder resin is either a polyester resin or a styrene-acrylic copolymer.

6. The anti-solvent laminate body according to claim 3, wherein the solvent is either gasoline or light oil and the anti-resistant index of the electrostatic latent image developer toner with respect to the gasoline or the light oil assumes a value not less than about 50%.

7. The anti-solvent laminate body according to claim 3, wherein the solvent is an alcohol compound and the anti-resistant index of the electrostatic latent image developer toner with respect to the alcohol compound assumes a value not less than about 50%.

8. The anti-solvent laminate body according to claim 3, wherein the solvent is a ketone compound sad the anti-resistant index of the electrostatic latent image developer toner with respect to the ketone compound assumes a value not less than about 50%.

9. The anti-solvent laminate body according to claim 1, wherein the solvent is gasoline or light oil and a subject is either a label for a vehicle or a label for a number plate.

10. The anti-solvent laminate body according to claim 1, wherein the solvent is an alcohol compound and a subject is either a label for a medical container or a cosmetic container.

11. The anti-solvent laminate body according to claim 1, wherein a cover layer is formed on a surface of the printing portion.

12. A manufacturing method of an anti-solvent laminate body which is used in an solvent atmosphere, wherein the manufacturing method includes a method for preparing an unprinted substrate portion by laminating an adhesive layer to a printing substrate, and a step performing printing based on a developing process using an electrostatic latent image developing toner containing a binder resin which has the solubility parameter (SP2) which is different from the solubility parameter (SP1) of the solvent by at least about 5 $(MJ/m^3)^{1/2}$ in an absolute value.

13. The manufacturing method of an anti-solvent laminate body according to claim 12, wherein as the electrostatic latent image developer toner, an electrostatic latent image developer toner having an anti-resistant index which is defined by a following formula (1) and falls within a range of about 50 to 100% is used $$\text{Anti-solvent index} = \frac{\text{line width (mm) after rubbing by a swab with solvent}}{\text{line width (mm) before rubbing by a swab with solvent}} \times 100(\%). \quad (1)$$

14. The manufacturing method of an anti-solvent laminate body according to claim 12, wherein the method further includes a step for forming a cover layer which covers the electrostatic latent image toner.

15. A number plate or a vehicle including an anti-solvent laminate body used in a solvent atmosphere comprising a substrate portion being characterized in that an electrostatic latent image developing toner is printed and a printing portion formed of the electrostatic latent image developing toner is adhered to the number plate or the vehicle as a label, and the electro latent image developing toner contains a binder resin which has a solubility parameter (SP2) which is different from a solubility parameter (SP1) of the solvent which forms the solvent atmosphere by not less than about 5 $(MJ/m^3)^{1/2}$ in an absolute value.

16. A vehicle including an anti-solvent laminate body used in a solvent atmosphere comprising a substrate portion being characterized in that an electrostatic latent image developing toner is printed and a printing portion formed of the electrostatic latent image developing toner is adhered to the number plate or the vehicle as a label, and the electro latent image developing toner contains a binder resin which has a solubility parameter (SP2) which is different from a solubility parameter (SP1) of the solvent which forms the solvent atmosphere by not less than about 5 $(MJ/m^3)^{1/2}$ in an absolute value.

17. A medical container including an anti-solvent laminate body used in a solvent atmosphere comprising a substrate portion being characterized in that an electrostatic latent image developing toner is printed and a printing portion formed of the electrostatic latent image developing toner is adhered to the medical container as a label, and the electro latent image developing toner contains a binder resin which has a solubility parameter (SP2) which is different from a solubility parameter (SP1) of the solvent which forms the solvent atmosphere by not less than about 5 $(MJ/m^3)^{1/2}$ in an absolute value.

18. A cosmetic container including an anti-solvent laminate body used in a solvent atmosphere comprising a substrate portion being characterized in that an electrostatic latent image developing toner is printed and a printing portion formed of the electrostatic latent image developing toner is adhered to the cosmetic container as a label, and the electro latent image developing toner contains a binder resin which has a solubility parameter (SP2) which is different from a solubility parameter (SP1) of the solvent which forms the solvent atmosphere by not less than about 5 $(MJ/m^3)^{1/2}$ in an absolute value.

* * * * *